No. 872,247. PATENTED NOV. 26, 1907.
A. L. MOSS.
AUTOMOBILE CHAIR.
APPLICATION FILED MAY 20, 1907.

WITNESSES
Edw. Thorpe
Hedy. Hostet

INVENTOR
Augustus Leicester Moss
BY
Munn & Co.
ATTORNEYS

UNITED STATES PATENT OFFICE.

AUGUSTUS LEICESTER MOSS, OF SANDUSKY, OHIO.

AUTOMOBILE-CHAIR.

No. 872,247.  Specification of Letters Patent.  Patented Nov. 26, 1907.

Application filed May 20, 1907. Serial No. 374,582.

*To all whom it may concern:*

Be it known that I, AUGUSTUS LEICESTER MOSS, a citizen of the United States, and a resident of Sandusky, in the county of Erie and State of Ohio, have invented a new and Improved Automobile-Chair, of which the following is a full, clear, and exact description.

The object of my invention is to provide a new and improved chair, more especially adapted for use in automobiles and simliar vehicles, and arranged to permit convenient adjustment of the chair in a longitudinal direction within the body of the vehicle, to suit the convenience of the occupant of the vehicle.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
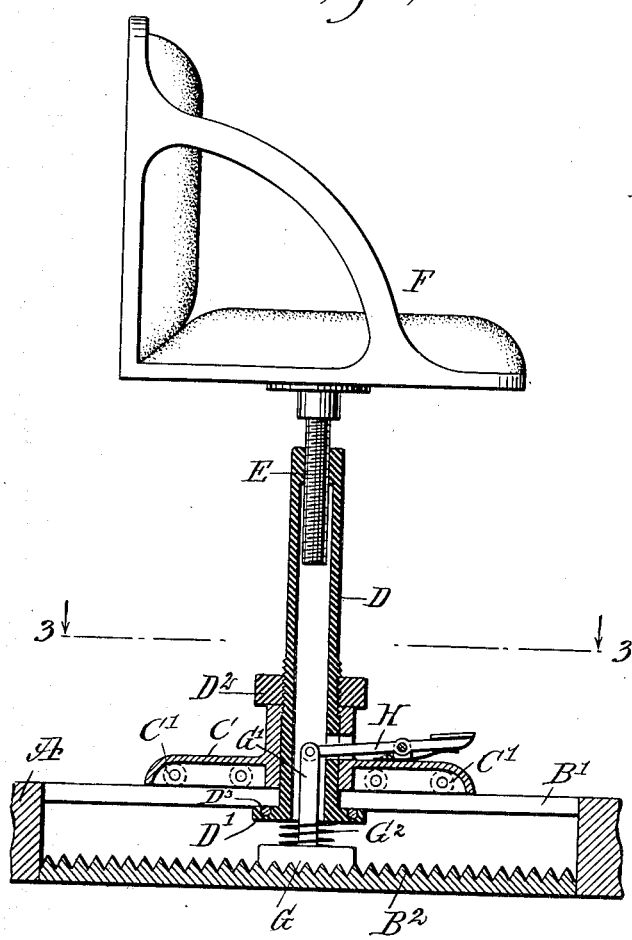
Figure 2:
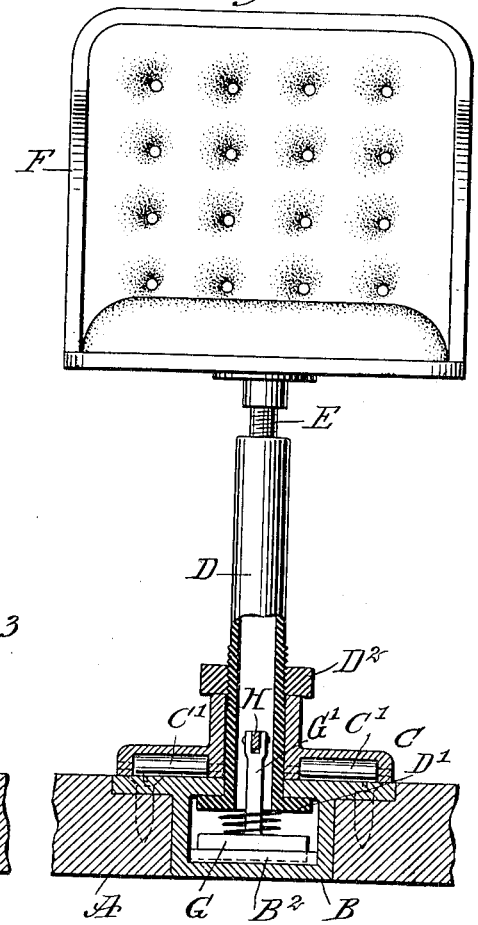
Figure 3:
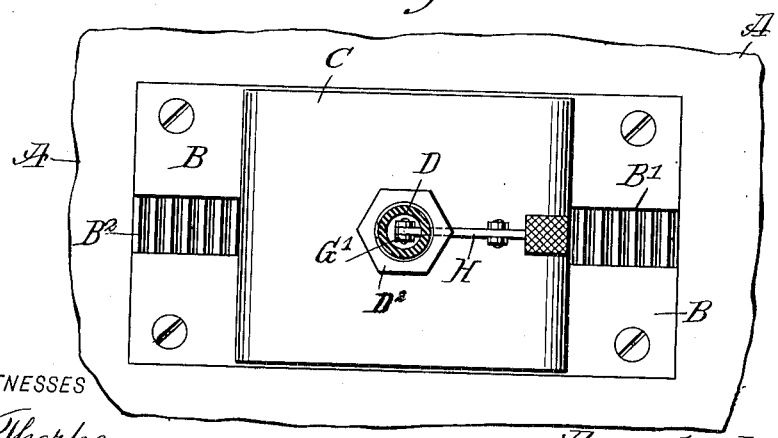

Figure 1 is a sectional side elevation of the improvement; Fig. 2 is a transverse section of the same, and Fig. 3 is a sectional plan view of the same on the line 3—3 of Fig. 1.

Into the bottom or floor of the vehicle body A is fitted a guideway B, approximately of box shape, and provided in its top with a longitudinally extending slot B', and provided on its bottom with notches or teeth B² extending in the direction of the slot B' and directly below the same. On the guideway B is mounted to slide the base C, through which extends the hollow post D, in which screws the screw rod E attached to the underside of a seat F of any approved construction. The lower end of the post D is provided with a flange D' having rollers D³ traveling on the underside of the top of the guideway B, and a nut D² screws on the post D adjacent the base C. The latter is provided with friction rollers C' traveling on the top of the guideway B. By adjusting the nut D² wabbling of the chair is prevented. In the lower end of the post D is mounted to slide vertically the shank G' of a toothed or serrated catch G normally pressed downward by a spring G² into engagement with corresponding notches or teeth B² to lock the post or standard D against longitudinal movement on the guideway B. The upper end of the shank G' is connected with a spring-pressed pedal H fulcrumed on the top of the base C, so that the operator can conveniently press the pedal H, to lift the catch G out of engagement with the corresponding notches B² to allow the operator to slide the post or standard D and its seat F forward or backward in the body of the vehicle, to suit the convenience of the occupants of the car. When the seat F and its post or standard D are in the desired position, then the operator releases the pedal H, so that the catch G moves downward and engages the corresponding notches B², to again lock the standard and its seat in the adjusted position.

From the foregoing it will be seen that the automobile chair shown and described is simple and durable in construction and can be readily adjusted to suit the convenience of the occupants of the automobile.

Having thus described my invention, I claim as new and desire to secure by Letters Patent:

1. A vehicle chair comprising a guideway in the bottom of the vehicle body, a post carrying a seat, a base mounted to slide on the top of said guideway and through which the said post extends, the lower end of the post extending into the guideway and having a flange engaging the under side of the top of the guideway, a nut adjustable on the post and adapted to engage the top of the base, and means for locking the base and post in position on the said guideway.

2. A vehicle chair comprising a guideway fixed in the bottom of the vehicle body and having a slot in the top and notches on the bottom and running in the direction of the slot, a post carrying a seat and provided with a flange extending into the said guideway, and a locking catch held on the said post and adapted to engage the said notches.

3. A vehicle chair comprising a guideway fixed in the bottom of the vehicle body and having a slot in the top and notches on the bottom and running in the direction of the slot, a post carrying a seat and provided with a flange extending into the said guideway, a locking catch held on the said post and adapted to engage the said notches, and a pedal for controlling the said catch.

4. A vehicle chair comprising a guideway fixed in the bottom of the vehicle body and having a slot in the top and notches on the bottom and running in the direction of the slot, a post carrying a seat and provided with a flange extending into the said guideway, a locking catch held on the said post and adapted to engage the said notches, and a base adjustable on the post and adapted to travel on the said guideway.

5. In combination with a vehicle, a guideway in the bottom of the vehicle body, a base mounted to slide on the top of the guideway, a post carrying a seat and extending through the base into the guideway, the post being provided at its lower end with a flange adapted to slide on the under side of the top of the guideway, means for holding the said base and the said flange of the post in sliding engagement with the top of the guideway to prevent wabbling of the chair, and means for locking the post and seat against movement.

6. The combination with a vehicle, of a guideway in the bottom of the vehicle, a post carrying a seat, a base mounted to move on said guideway and through which the said post extends, a nut screwing on the post adjacent to the base, and means for locking the base and post in position on the guideway.

7. The combination with a vehicle, of a guideway in the bottom of the vehicle, the said guideway having a slot in its top and provided on its bottom with teeth extending in the direction of the slot, a post carrying a seat, a base mounted to move on the guideway and through which the said post extends, a pedal fulcrumed on the top of the base, and a spring-pressed toothed catch normally held in engagement with the teeth on the bottom of the guideway, the said catch having a shank connected with said pedal.

8. The combination with a vehicle, of a guideway in the bottom of the vehicle, the said guideway having a slot in its top and provided on its bottom with teeth, a post carrying a seat and provided with a flange extending into the said guideway, the said flange being provided with rollers engaging the under side of the top of said guideway, a spring pressed toothed catch normally held in engagement with the teeth on the bottom of the guideway, the said catch having a vertical shank extending into the lower end of said post, and means connected with the said shank for lifting the catch.

9. The combination with a vehicle, of a guideway in the bottom of the vehicle, the said guideway having a slot in its top and provided on its bottom with teeth, a base provided with rollers and mounted to travel on the top of said guideway, a post carrying a seat and extending through the base and the slot in the top of the guideway, the post being provided at its lower end with a flange having rollers engaging the under side of the top of the guideway, and means for locking the said base and post in position on the said guideway.

In testimony whereof I have signed my name to this specification in the presence of two subscribing witnesses.

AUGUSTUS LEICESTER MOSS.

Witnesses:
N. E. PUHR,
L. H. ERNST.